July 23, 1963   W. B. CAMPBELL   3,098,263
APPARATUS FOR MOLDING A BALL AND SOCKET JOINT ASSEMBLY
Filed June 22, 1960   4 Sheets-Sheet 1

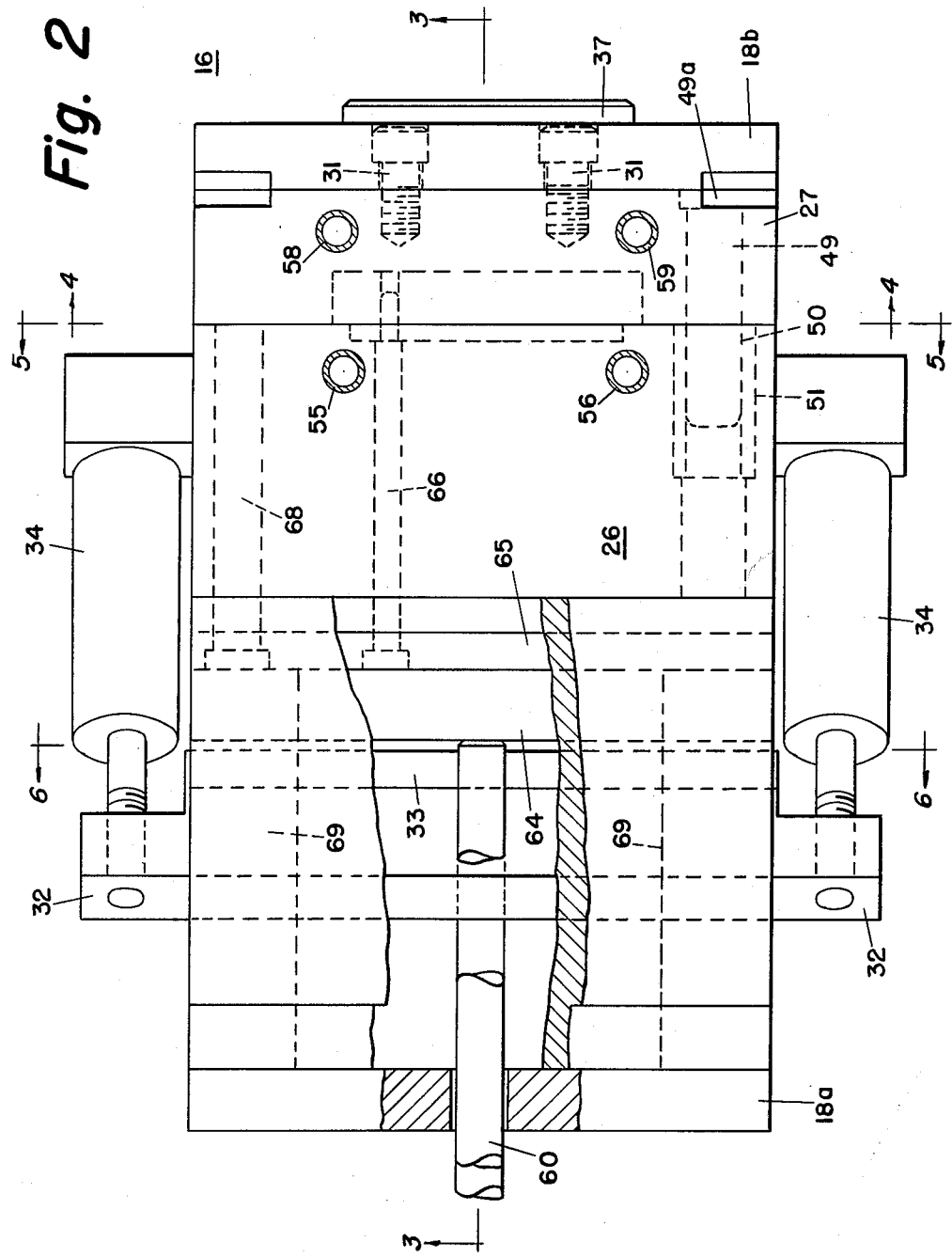

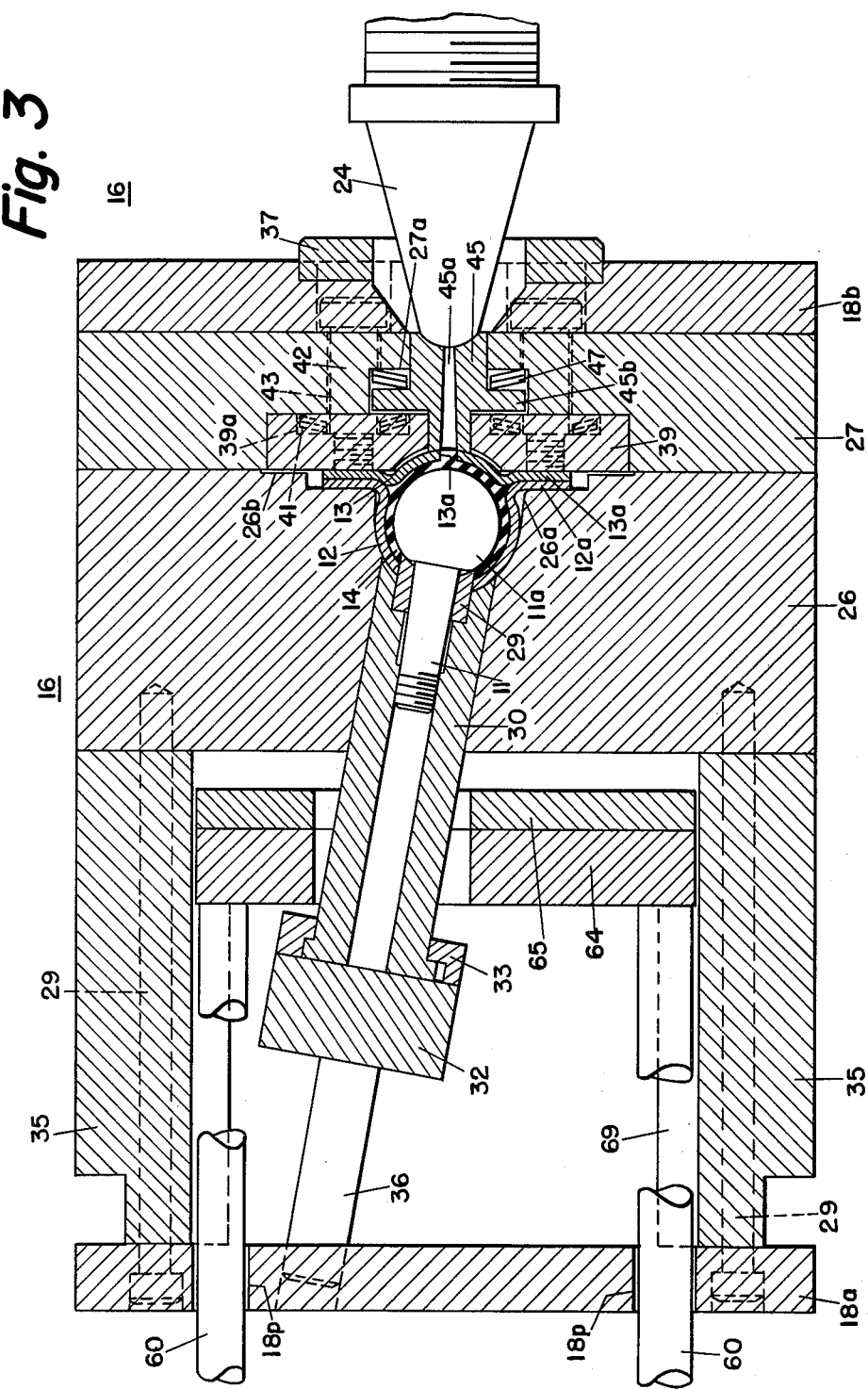

July 23, 1963    W. B. CAMPBELL    3,098,263
APPARATUS FOR MOLDING A BALL AND SOCKET JOINT ASSEMBLY
Filed June 22, 1960    4 Sheets-Sheet 4
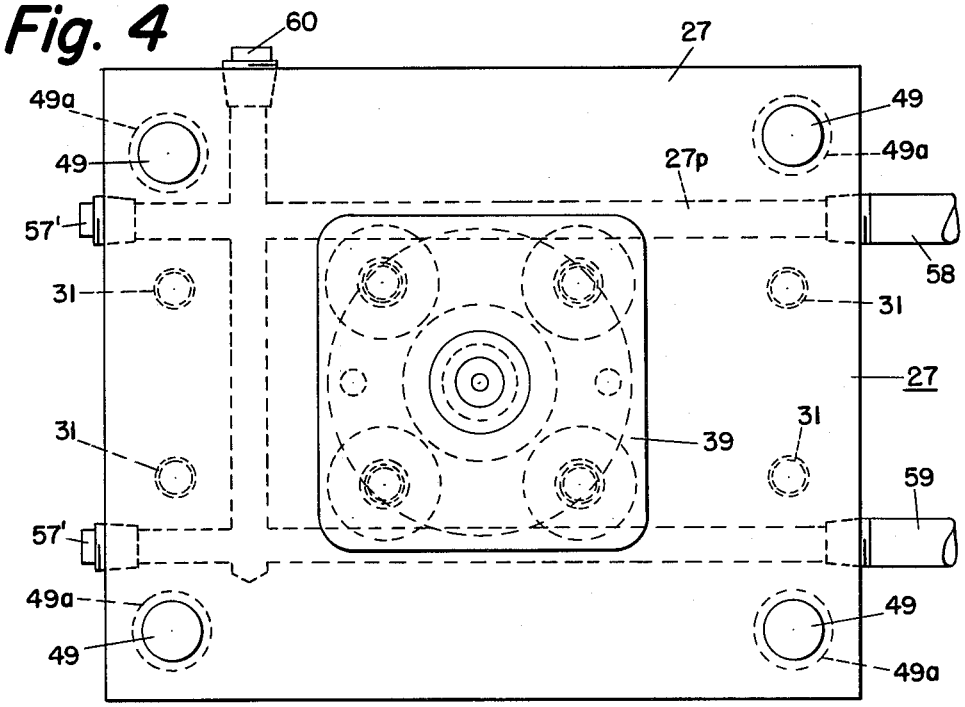
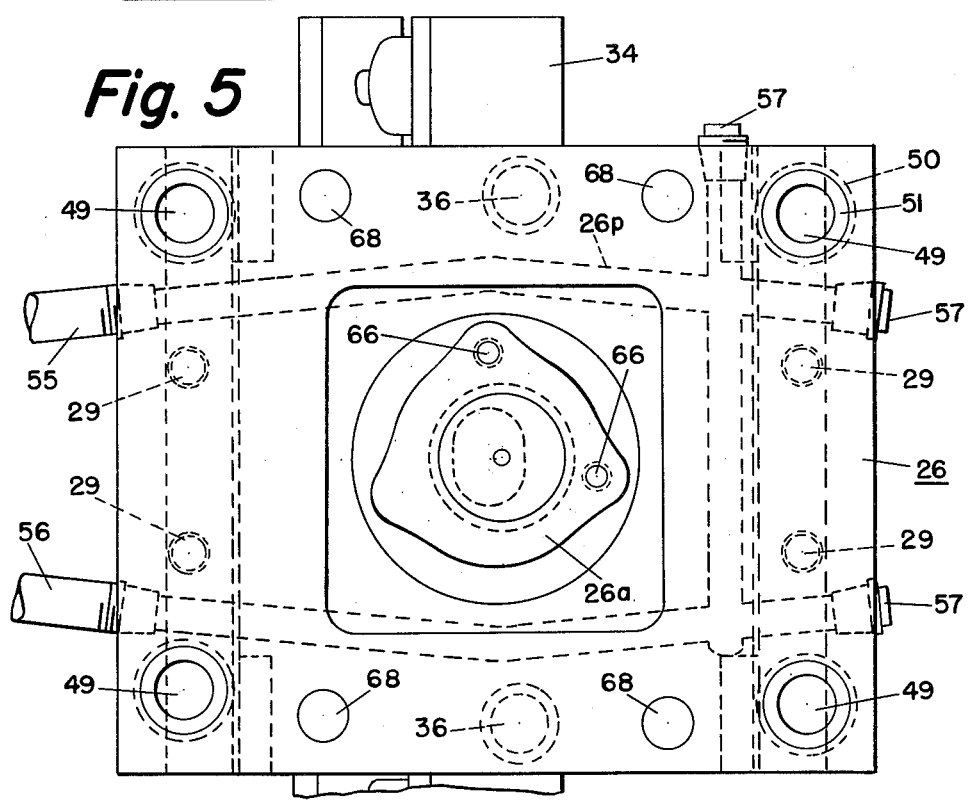

United States Patent Office 3,098,263
Patented July 23, 1963

3,098,263
APPARATUS FOR MOLDING A BALL AND SOCKET JOINT ASSEMBLY
William B. Campbell, Haddonfield, N.J., assignor, by mesne assignments, to Garlock Inc., Palmyra, N.Y., a corporation of New York
Filed June 22, 1960, Ser. No. 38,058
6 Claims. (Cl. 18—36)

This invention relates to an apparatus for molding a ball and socket joint assembly and has for an object a system for providing an improved ball and socket joint assembly wherein the plastic lining of the assembly is molded in situ.

This invention is particularly directed to the manufacture of ball and socket joint assemblies adapted for use in suspension and stabilization of automobiles. In the past it has been the practice to provide ball and socket joint assemblies either with metal to metal contact or with a lining material such as a moldable non-metallic high impact material. In the case of the latter, it has been the practice to mold the lining material around the ball portion of the stud and then to assemble the housing or socket over the lining material. This manner of constructing ball and socket joint assemblies utilizes a plurality of operations and leaves much to be desired in obtaining a good fit between the lining and housing and one which will be continuous in compensating for wear. It is desirable to produce a joint of uniform torque and decrease these operations to a minimum in order to minimize the cost of the assembly. Such assembly costs can be reduced by eliminating at least one of the assembly operations and this can be acomplished by molding the plastic liner in situ between the ball portion of the stud and the housing or socket. Such molding operation presents a number of problems. One of the problems is to minimize the shrinkage of the plastic when it contacts the metal parts of the assembly ad a second problem is to enable the same mold to produce satisfactory parts when parts of either the maximum or minimum tolerances are used. These problems are overcome by the present invention and the resulting ball joint assembly has a perfect fit between the plastic liner and the metal parts regardless of their specific dimensions within the maximum and minimum tolerances.

In accordance with the present invention there is provided a system for making a ball joint assembly including a mold having a plurality of sections one of which is provided with a mold cavity adapted to receive a ball stud and a housing surrounding a portion of the ball on the stud. The ball stud is supported in the mold cavity in spaced relation with the housing preparatory to receiving a plastic material therebetween. Another mold section is disposed adjacent the cavity mold section in face to face relation and is adapted to maintain a cover in predetermined relation with the housing. This mold section includes spring-biased means movable within an enclosure formed between the mold sections and engaging the cover to permit the respective faces of the mold sections to be maintained in tight engagement while accommodating assembled covers and housings of the ball joint assembly within a predetermined tolerance. The spring-biased means has an area less than that of the face of one of the molded sections and as great as that of the cover. The spring-biased means has an opening therethrough for passage of the plastic material between the mold sections and into the spacing formed between the ball stud and housing. The mold section which receives the cover includes a spring-biased sprue bushing extending through the opening in the spring-biased means and engageable with the cover and movable independently relative to the other parts of the mold section. In the preferred form of the invention, the ball stud is supported within the mold by hydraulic means.

For a more detailed description of the invention and for further objects and advantages thereof, reference is to be had to the following description taken in conjunction with the accompanying drawings in which:

FIG. 2 is a top plan view of the mold taken along the lines 2—2 in FIG. 1 with portions thereof broken away for clarity;

FIG. 3 is a sectional view taken along the lines 3—3 in FIG. 2;

FIG. 4 is a view taken along the lines 4—4 in FIG. 2;

FIG. 5 is a view taken along the lines 5—5 in FIG. 2; and

Figure 1:
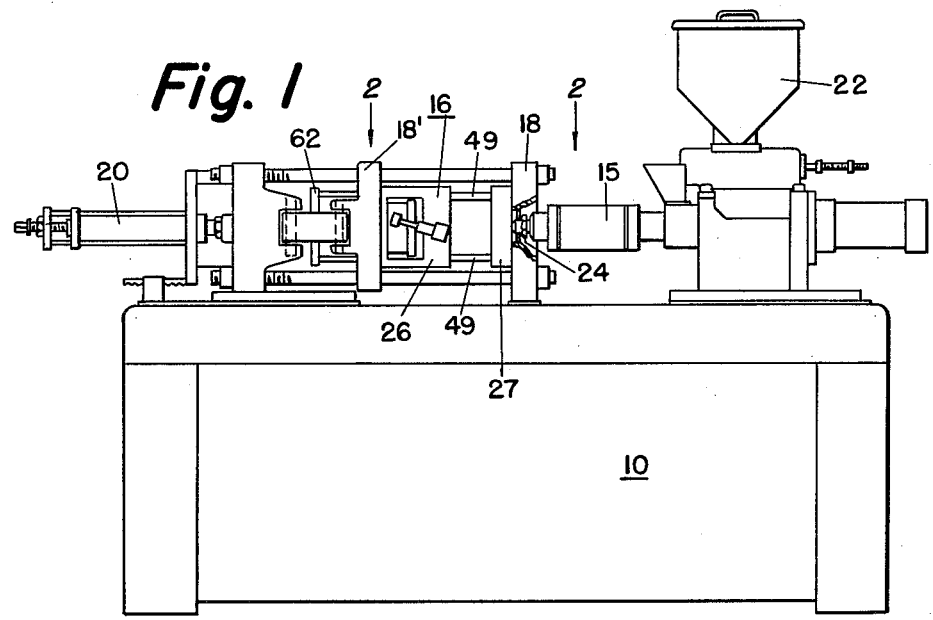
FIG. 1 is an elevation view of an injection molding machine including a mold embodying the present invention.

Referring to the drawings there is shown in FIG. 1 an injection-molding machine 10 of well-known type and suited for molding in situ the plastic linings for universal joints such as the ball joint assemblies adapted for use in suspension mechanisms of automobiles. One form of ball joint assembly is shown in FIG. 3 and consists of a studmember 11 having a ball-shaped end 11a which is adapted to be received within a housing 12. A cover 13 is adapted to be secured to the upper end of the housing 12. The cover 13 has an opening 13a therein through which a suitable injection-moldable thermoplastic material is adapted to be forced under pressure to provide a plastic liner between the portion 11a of stud 11 and the housing 12 and cover 13. The injection-moldable thermoplastic material should have the characteristics of being resistant to impact, heat and cold and corrosion, and moldable with a resulting controlled torque to provide a dry-bearing material which is noise-free in operation. Two examples of suitable materials are a glass-filled acetal resin sold under the trademark "Delrin" and a glass-filled polyamide sold under the trademark "Nylon." It is to be understood that other equivalent injection-moldable thermoplastic materials having the aforesaid characteristics may be used. The present invention is not directed to the ball joint assembly per se, but instead is directed to the method and apparatus for making such ball joint assembly.

As may be seen in FIG. 1, the injection-molding machine 10 is of the type which injects a heat-softened and flowable material, such as the materials described above, from a heating cylinder 15 into a die or mold 16, the latter having been shown in openind position in FIG. 1. In FIG. 2 the die or mold 16 is shown in closed position. The mold 16 is adapted to be clamped between a pair of clamping members 18, 18' of conventional construction and which comprise part of the molding machine 10. These clamping members 18, 18' are associated with an hydraulic cylinder 20 of machine 10 which is adapted to apply clamping pressure to the mold 16 in the order of several tons, such for example as about 75 tons. The injection-moldable plastic material in the form of molding granules is placed into a hopper 22 on the machine 10 from which they are fed into the heating cylinder 15. The cylinder 15 is provided with a plunger (not shown) which forces the material into the mold 16 by way of a discharge nozzle 24. The temperature within the cylinder 15 is maintained at a predetermined level by electric heating units or other suitable means well-known in the art. The temperature of the mold 16 is lower than the softening point of the plastic material and thus the mold rapidly absorbs heat from the soft plastic material causing it to harden.

Figure 6:
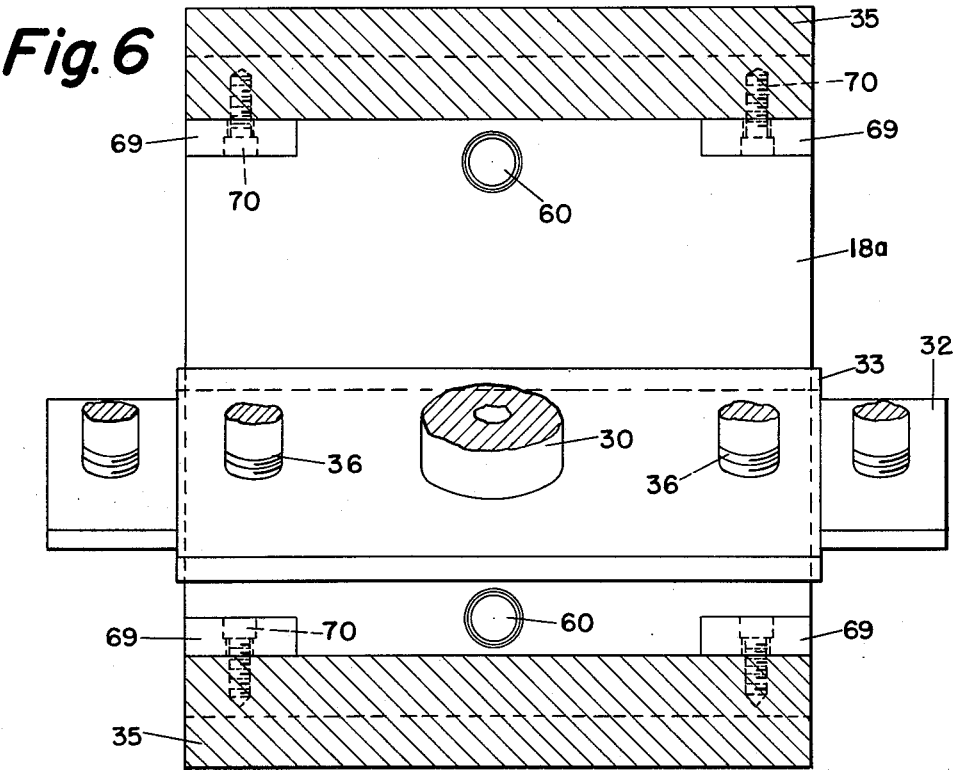
FIG. 6 is a sectional view taken along the lines 6—6 in FIG. 2.

Referring to FIGS. 2 and 3, it will be seen that the mold 16 includes a cavity section 26 and a force retainer plate section 27. The cavity section 26 is adapted to receive the housing 12, FIG. 3, of the ball joint assembly and also the ball stud member 11. The ball stud member 11 is supported in spaced relation to the interior of the housing 12 by means of a retainer sleeve insert 29 which in turn is supported by a retainer sleeve 30 which extends through an opening in the cavity section 26. The rear end of the retainer sleeve 30, i.e., the end remote from the ball stud 11 is held against a sleeve knockout plate 32 by means of a sleeve retainer plate 33. The sleeve knockout plate 32 extends completely across the mold 16 as shown in FIG. 2 and the outer ends of the plate 32 are connected to hydraulic cylinders 34 at opposite sides of the mold. The plate 32 is provided with a pair of guide pins 36 which are disposed on opposite sides of the retainer sleeve 30, FIG. 6. These guide pins 36 guide the knockout plate 32 during its movement by the hydraulic cylinders 34. The purpose of the hydraulic cylinders 34 will later be described.

The cavity section 26 of mold 16 is supported from a clamp plate 18a by means of a pair of support rails 35 and screw members 29, FIG. 3. The force retainer plate section 27 of the mold is supported by another clamp plate 18b by means of screws 31, FIG. 2. The clamp plates 18a and 18b are adapted to be secured to the respective clamping members 18, 18' of machine 10. The clamp plate 18b has a locating ring 37 through which the nozzle 24 is adapted to extend. The retainer plate section 27 is provided with a recess which is adapted to receive a force plate 39, FIG. 4, the outer surface of which is shaped for conformity with the abutting surface of the cover member 13 of the ball joint assembly, FIG. 3.

As may be seen in FIGS. 3 and 5, the cavity section 26 of the mold 16 is provided with a cavity or recess 26a which is shaped to receive the housing 12 of the ball joint assembly. As may be seen in FIG. 3, the flanged portions 12a and 13a of the housing and cover of the ball joint assembly are adapted to be positioned between the opposing surfaces of the mold sections 26 and 27. This surface of mold section 27 is located on the force plate member 39. The combined thickness of the flange portions 12a and 13a of the ball joint assembly may vary within a predetermined tolerance and still be satisfactory for use in suspension mechanisms of automobiles. It is desirable that this tolerance be as wide as possible in order that the cost of manufacturing the housing 12 and cover members 13 may be kept to a minimum. The present invention enables the same mold to accommodate all sizes of housing and cover parts within the foregoing broad tolerances. To accommplish this, the rear surface of the force plate 39 is provided with a plurality of recesses 39a which are disposed around the center of the member 39 and are adapted to receive a series of disc-type spring washers 41. The washers 41 are positioned on a series of screw members 42 which extend through openings 43 in the mold section 27 and are provided with threads at their outer ends which are secured to the force plate 39 and retain the latter in the mold section 27. It will be noted in FIG. 3 that the ball joint assembly illustrated therein includes a housing 12 and cover 13 having flanges 12a and 13a of a total thickness corresponding to the maximum tolerance dimension. Thus the force plate 39 is pressed against the mold section 27 and the washer members 41 are in compressed condition. It will be noted that the mold sections 26 and 27 are in tight engagement with each other. When a ball joint assembly having a flange thickness corresponding to the minimum tolerance dimension is inserted in the mold, the washers 41 will force the force plate 39 outwardly of mold section 27 into the recessed portion 26b of the cavity mold section 26 and tightly against the exposed or adjacent surface of the cover member 13. By providing the mold section 26 with the recess portion 26b, the force plate 39 does not interfere with the closing or mating of the two mold section members 26 and 27. It will be noted that in FIG. 3 that the head portions of the screws 42 are spaced above the mold section 27 a distance corresponding approximately to the depth of the recess 26b in mold section 26.

The mold section 27 is provided with a sprue bushing 45 which has a passage 45a therethrough for passage of the plastic from the nozzle 24 to the orifice or opening 13a in the cover member 13. It will be noted that the sprue bushing at its opposite ends is in tight engagement with the nozzle 24 and the surface of cover member 13 surrounding the opening 13a. This condition must be obtained for all ball joint assemblies within the permissible tolerance range. Otherwise, the plastic material would be forced between any space appearing between the cover 13 and the adjacent end of the sprue bushing 45. To insure the tight engagement of the sprue bushing 45 with the cover 13, as shown in FIG. 3, the sprue bushing is constructed so that it is movable relative to the force plate 39 against the bias of disc spring washers 47 which are adapted to be compressed between the external shoulder 45b on the sprue bushing 45 and the internal shoulder 27a formed at the bottom of the recess in the mold section 27. When the mold sections 26 and 27 are in closed position, as shown in FIG. 3, the cover member 13 will move against the adjacent end of the sprue bushing 45 causing the disc washers 47 to be compressed in the manner illustrated.

Referring to FIG. 1, it will be recalled that the mold 16 is shown in open position with the movable mold section 26 spaced from the fixed mold section 27. A plurality of leader pins 49 interconnect the mold sections 26 and 27 with the mold 16. These leader pins 49 are retained in the fixed section 27 of the mold between the clamp plate 18b and the mold section 27, FIG. 2. It will be noted that the leader pins 49 are provided with a head 49a to prevent them from being displaced from the mold section 27. The mold section 26 is provided with mating openings or passages 50 for receiving the respective leader pins 49. The passages 50 are each lined with bushings 51 which have an internal diameter of sufficient dimension to provide a slip fit with the leader pins 49.

The mold section 26 is adapted to be moved to the right, as shown in FIG. 1, until it is in engagement with the stationary or fixed mold section 27. At this time the various parts will assume the positions shown in FIG. 2. A predetermined quantity of the plastic material is then injected under high pressure into the mold 16 by way of the nozzle 24, FIG. 3. This predetermined quantity is adequate to completely fill the space between the ball portion 11a of stud 11 and the adjacent interior surfaces of housing 12 and cover 13, thus providing a plastic liner 14 which, either with or without an inner liner, completely fills the spacing between the metal parts of the ball joint assembly. By molding the plastic liner 14 in situ, there is eliminated the subsequent assembly operation heretofore employed in ball joint assemblies such, for example, as the type described in Baker, Patent No. 2,879,091, thus minimizing assembly costs and at the same time providing an improved ball joint assembly construction.

Before the metal parts of the ball joint assembly i.e., the ball stud 11, either with or without an inner liner, the housing 12 and the cover 13 are placed in the mold 16; they are soaked in an electrically-heated oven to bring their temperatures up to about 250° F. to 275° F. This temperature is critical with respect to the specific plastic materials mentioned above and if significantly lower or higher temperatures are used, the molding operation cannot be performed satisfactorily. Adequate control of torque on the molded parts is also a function of the pressure applied to the molding compound during the actual injection process. It has been found that the best control is obtainable when the parts are molded with a slight "cushion" of molding compound with the injection plunger in the advanced position. The sections 26 and 27 of the mold 16 are maintained at a predetermined temperature during the molding process by means of a heated liquid, such as oil, which goes through internal passages 26p and 27p in sections 26 and 27. The passages 26p in mold section 26 are connected with inlet and outlet pipes 55 and 56, FIG. 5. The passages 26p are sealed from the exterior of the mold section 26 by suitable pipe plugs 57. Similarly in FIG. 4, the flow passages 27p are provided with inlet and outlet pipes 58 and 59 which are connected to a suitable source of heated liquid and the passages 27p are sealed from the exterior of the mold section 27 by suitable pipe plugs 57'. The liquid, which is adapted to pass through the flow passages 26p and 27p preferably is oil heated to a temperature of approximately 275° F. to 300° F. This insures that the mold will be maintained at a predetermined temperature below the temperature of the molding compound being injected into the mold and thus causing the molding compound to harden in a predetermined length of time. The purpose of this pre-heating is two-fold in that it permits a better flow of plastic material into the housing 12 and around the stud 11 and additionally it expands all the metal parts, 11, 12 and 13. After the molding operation is completed, the metal parts, 11–13, contract as the molding compound 14 goes through its phase of mold shrinkage. If the metal parts of the assembly are not pre-heated, it is impossible to control the torque of the assembly after molding.

As mentioned above, the support 30 for the ball stud 11 is carried by a sleeve knockout plate 32 which in turn is connected to hydraulic cylinders 34 at the opposite sides of the mold. The hydraulic cylinders 34, in combination with the spring loading of the force plate 39, enable the mold to fully compensate for the range of dimensional tolerances on the cover and housing parts 12 and 13 of the ball joint assembly. The ball stud assembly is placed in the mold with the hydraulic cylinders 34 in forward position. The total force available by this hydraulic action is sufficient to withstand opposing pressure of the plastic material as it is injected into the cavity. If, however, the parts are sufficiently oversized, the clamping pressure of the press which greatly exceeds the injection pressure, is sufficient to cause the hydraulic cylinders 34 to drift back slightly to compensate still further for irregularities in dimensions.

It will now be assumed that the molding process has been completed and the mold or die 16 is to be moved from its closed position, shown in FIG. 2, to its open position, shown in FIG. 1. The movable section 26 of the die moves to the left as shown in FIG. 2 under the control of the hydraulic cylinder 20, FIG. 1. This movement causes the knockout rods 60, which are loosely carried by passages 18p in clamp plate 18a, to be engaged at their rear ends by a stationary knockout plate 62 carried by and which forms part of the molding machine 10, FIG. 1. The forward ends of the knockout rods 60 engage a knockout plate 64 which is provided with a retainer 65 for holding a pair of knockout pins 66. The ends of these pins 66 are adapted to engage two of the corners of the housing 12 for the ball joint assembly, as shown in FIG. 5. Only one of the knockout pins 66 appears in FIG. 2. As the movable section 26 of the mold moves further to the left and thus away from the stationary section 27, the knockout plate 64 causes the knockout pins 66 to push the molded ball joint assembly from its cavity in mold section 26, FIG. 3. As may be seen in FIG. 2, the pins 66 are provided with a shoulder which engages the lower surface of the flange portion 12a of the housing 12. Concurrently with this action the hydraulic cylinders 34 cause the knockout plate 32 to force the ball joint assembly out of the cavity in mold section 26 along an inclined axis whereas the knockout pins 66 act along a horizontal axis. This combined knockout action enables the completed ball joint assembly to be quickly and readily removed from the mold cavity. The distance of movement of the knockout pins 66 corresponds to the spacing illustrated in FIG. 2 between the adjacent surfaces of retainer member 65 and the left-hand end of section 26. When these two surfaces are in engagement, the molded ball joint assembly will have been ejected from the cavity in mold section 26.

At this time it will be noted that the guide pins 68 which are carried by the knockout plate 64 will have been moved to the right from their position illustrated in FIG. 2 so that they will extend beyond their passages in mold cavity 26. These guide pins 68 are adapted to return the knockout plate 64 and the retainer plate 65 to their original positions against backstop members 69 which are secured, as by screws 70, to the support rails 35, FIGS. 2, 3 and 6, as shown in FIG. 2. This takes place in the following manner: When the mold section 26 is moved to the right from the open position shown in FIG. 1, to the closed position shown in FIG. 2, to perform a subsequent molding operation, the guide pins 68 will first engage the abutting surface of the stationary member section 27. As the mold section 26 continues to move to the right towards closed position, for the mold, the pins 68 will cause the knockout plate 64 and the retainer 65 to move to the left until they occupy the position shown in FIG. 2 against the backstop members 69 with the mold sections 26 and 27 in closed or clamped position. At this time the spacing between the knockout plate 64 and the fixed knockout plate 62, FIG. 1, is greater than the overall length of the knockout rods 60, the latter being free to slide in their openings in the clamp plate 18a between the knockout plates 62 and 64.

While the preferred embodiment of this invention has been illustrated, it is to be understood that other modifications thereof may be made within the scope of the appended claims.

What is claimed is:

1. Apparatus for making a ball joint assembly comprising a mold including a plurality of sections, one of said sections having a mold cavity shaped to receive a ball stud and a housing surrounding a portion of the ball on the stud, means in said mold cavity for supporting the ball stud in spaced relation with the housing preparatory to receiving a plastic material therebetween, another mold section disposed adjacent said first-named mold section in face to face relation and adapted to maintain a cover in predetermined relation with the housing, said last-named section including spring-biased means for engaging the cover and having an area less than that of the face of said last-named mold section and as great as that of the cover, said spring-biased means having an opening therethrough for passage of the plastic material between said mold sections and into the spacing formed between the ball stud and housing, said spring-biased means being movable within an enclosure formed between said mold sections and permitting the respective faces of said mold sections to be maintained in tight engagement while accommodating assembled covers and housings of the ball joint assembly within a predetermined tolerance.

2. Apparatus according to claim 1 wherein said last-named mold section includes a spring-biased sprue bushing extending through the opening in said spring-biased means to engage the cover and movable independently relative to the other parts of said last-named section.

3. Apparatus according to claim 1 including hydraulic means for supporting the ball stud within said mold.

4. Apparatus for molding in situ a plastic liner for a ball joint assembly of the type including a ball stud surrounded by the plastic liner and enclosed within a housing and a cover, the housing and cover having a thickness within a predetermined tolerance range, comprising a mold including a plurality of sections, one of said sections having a mold cavity adapted to receive the ball stud and a housing surrounding a portion of the ball on the stud, means extending into said one section for supporting the ball stud in spaced relation with the housing preparatory to receiving a plastic material therebetween, a second mold section disposed adjacent to said first-named mold section in face to face relation, said second mold section including a force plate having an area less than that of the face of said second mold section and as great as that of the cover and adapted to maintain the cover in predetermined relation with the housing, said force plate being movable within an enclosure formed between said mold sections, said force plate having an opening therethrough for passage of the plastic material between said mold sections and into the spacing formed between the ball stud and housing, compression spring means disposed between said second section and said force plate permitting the respective faces of said mold sections to be maintained in tight engagement and concurrently permitting said force plate to adjust its position within said enclosure relative to said second mold section to accommodate assembled covers and housings of different thicknesses for the ball joint assembly within the predetermined tolerance range.

5. Apparatus according to claim 4 wherein said force plate is carried by a plurality of fastener members extending through said second mold section and said compression spring means comprises a plurality of spring members disposed on said fastener members between said second mold section and said force plate.

6. Apparatus for molding in situ a plastic liner for a joint assembly of the type including at least two engaged metal parts enclosing the plastic liner, the metal parts having a combined thickness which may vary within a predetermined tolerance range, comprising a mold including a plurality of sections, one of said sections having a mold cavity adapted to receive the metal parts and support them in predetermined spaced relation preparatory to receiving a plastic material therebetween, a second mold section disposed adjacent said first-named mold section in face to face relation, said second mold section including a force plate adapted to engage the adjacent one of the metal parts and coextensive in area therewith to maintain it in predetermined relation with the other metal part, said force plate having an opening therethrough for passage of the plastic material between said mold sections and into the spacing formed between the two metal parts, said force plate being movable within an enclosure formed between said mold sections, compression spring means disposed between said second section and said force plate permitting the respective faces of said mold sections to be maintained in tight engagement and concurrently permitting said force plate to adjust its position relative to said second mold section to accommodate assembled metal parts of the joint assembly within the predetermined tolerance range.

References Cited in the file of this patent

UNITED STATES PATENTS

| | | |
|---|---|---|
| 1,846,482 | Fiegel | Feb. 23, 1932 |
| 2,241,180 | Burke | May 6, 1941 |
| 2,265,995 | Begerlein | Dec. 16, 1941 |
| 2,443,826 | Johnson | June 22, 1948 |
| 2,473,481 | Tobener | June 14, 1949 |
| 2,483,093 | Harvey | Sept. 27, 1949 |
| 2,587,070 | Spillman | Feb. 26, 1952 |
| 2,655,692 | Fay | Oct. 20, 1953 |
| 2,891,283 | Cramer et al. | June 23, 1959 |
| 2,954,992 | Baker | Oct. 4, 1960 |
| 2,961,704 | White | Nov. 29, 1960 |
| 2,979,772 | Moslo | Apr. 18, 1961 |
| 2,999,273 | Gronemeyer et al. | Sept. 12, 1961 |

FOREIGN PATENTS

| | | |
|---|---|---|
| 1,123,873 | France | June 18, 1956 |

OTHER REFERENCES

Plastics Engineering Handbook, Society of the Plastics Industry, 1954, page 494.